(12) United States Patent
Redberg

(10) Patent No.: US 10,007,804 B2
(45) Date of Patent: *Jun. 26, 2018

(54) SECURE CLOUD STORAGE DISTRIBUTION AND AGGREGATION

(71) Applicant: Fortinet, Inc., Sunnyvale, CA (US)

(72) Inventor: David A. Redberg, Brooklyn, NY (US)

(73) Assignee: Fortinet, Inc., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/379,348

(22) Filed: Dec. 14, 2016

(65) Prior Publication Data

US 2017/0098096 A1    Apr. 6, 2017

Related U.S. Application Data

(60) Continuation of application No. 14/741,715, filed on Jun. 17, 2015, now Pat. No. 9,536,103, which is a
(Continued)

(51) Int. Cl.
*H04L 29/06* (2006.01)
*G06F 21/00* (2013.01)
(Continued)

(52) U.S. Cl.
CPC .... *G06F 21/6227* (2013.01); *G06F 17/30106* (2013.01); *G06F 21/602* (2013.01); *H04L 63/20* (2013.01); *G06F 17/30194* (2013.01)

(58) Field of Classification Search
CPC ................................................. G06F 21/6218
See application file for complete search history.

(56) References Cited

U.S. PATENT DOCUMENTS 8,819,768 B1   8/2014 Koeten et al.
9,280,678 B2   3/2016 Redberg
(Continued)

OTHER PUBLICATIONS

Non-Final Rejection for U.S. Appl. No. 14/094,484 dated Aug. 7, 2015.
(Continued)

*Primary Examiner* — Lisa C Lewis
(74) *Attorney, Agent, or Firm* — Hamilton, DeSanctis & Cha LLP

(57) ABSTRACT

Methods and systems for vendor independent and secure cloud storage distribution and aggregation are provided. According to one embodiment, an application programming interface (API) is provided by a cloud storage gateway device logically interposed between third-party cloud storage platforms and users of an enterprise. The API facilitates storing of files, issuing of search requests against the files and retrieval of content of the files. A file storage policy is assigned to each user, which defines access rights, storage diversity requirements and a type of encryption to be applied to files. Responsive to receiving a request to store a file, (i) searchable encrypted data is created relating to content and/or metadata of the file based on the assigned file storage policy; and (ii) the searchable encrypted data is distributed among the third-party cloud storage platforms based on the storage diversity requirements defined by the assigned file storage policy.

12 Claims, 12 Drawing Sheets

Related U.S. Application Data division of application No. 14/094,484, filed on Dec. 2, 2013, now Pat. No. 9,280,678.

(51) Int. Cl.
*G06F 21/62* (2013.01)
*G06F 21/60* (2013.01)
*G06F 17/30* (2006.01)

(56) References Cited

U.S. PATENT DOCUMENTS

| | | | |
|---|---|---|---|
| 9,495,556 | B2 | 11/2016 | Redberg |
| 9,536,103 | B2 | 1/2017 | Redberg |
| 2008/0226257 | A1 | 9/2008 | Asanuma et al. |
| 2010/0088311 | A1 | 4/2010 | Du et al. |
| 2010/0312749 | A1 | 12/2010 | Brahmadesam et al. |
| 2010/0332401 | A1* | 12/2010 | Prahlad ............ G06F 17/30082 705/80 |
| 2013/0109412 | A1* | 5/2013 | Nguyen ............ G06Q 30/0207 455/456.3 |
| 2013/0133023 | A1 | 5/2013 | Burstein et al. |
| 2013/0179490 | A1* | 7/2013 | Naga ................ G06F 17/30165 709/203 |
| 2013/0207775 | A1 | 8/2013 | Guralnik et al. |
| 2014/0052999 | A1 | 2/2014 | Aissi et al. |
| 2014/0122866 | A1 | 5/2014 | Haeger et al. |
| 2014/0136675 | A1 | 5/2014 | Yao et al. |
| 2015/0046971 | A1 | 2/2015 | Hu et al. |
| 2015/0074398 | A1 | 3/2015 | Cullen et al. |
| 2015/0154418 | A1 | 6/2015 | Redberg |
| 2015/0363608 | A1 | 12/2015 | Redberg |
| 2015/0363611 | A1 | 12/2015 | Redberg |

OTHER PUBLICATIONS

Requirement for Restriction/Election for U.S. Appl. No. 14/094,484 dated Jun. 15, 2015.
AlephCloud. FAQ. http://www.alephcloud.com/#!faq/c1pya. 2 pgs.
AlephCloud. "AlephCloud Raises $7.5M Series B for New Approach to Cloud Content Privacy Management." http://www.alephcloud.com/#!pr-20130522/cbri. 2 pgs.
AlephCloud. "Content Canopy." http://www.alephcloud.com/#!products/cife. 1 pg.
AlephCloud. "It's the Content, not the Container." http://www.alephcloud.com/#!solution/c15sb. 1 pg.
Notice of Allowance for U.S. Appl. No. 14/094,484 dated Jan. 29, 2016.
Notice of Allowance for U.S. Appl. No. 14/824,769 dated Aug. 26, 2016.
Notice of Allowance for U.S. Appl. No. 14/741,715 dated Nov. 10, 2016.
Non-Final Rejection for U.S. Appl. No. 14/741,715 dated Jul. 29, 2016.

\* cited by examiner

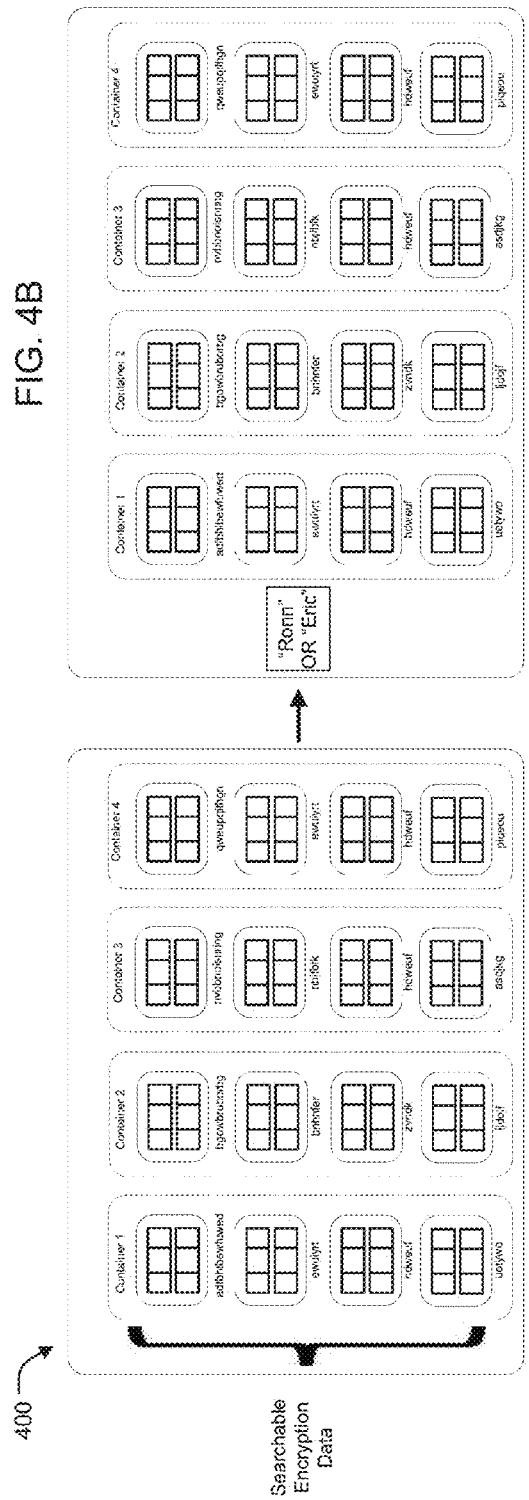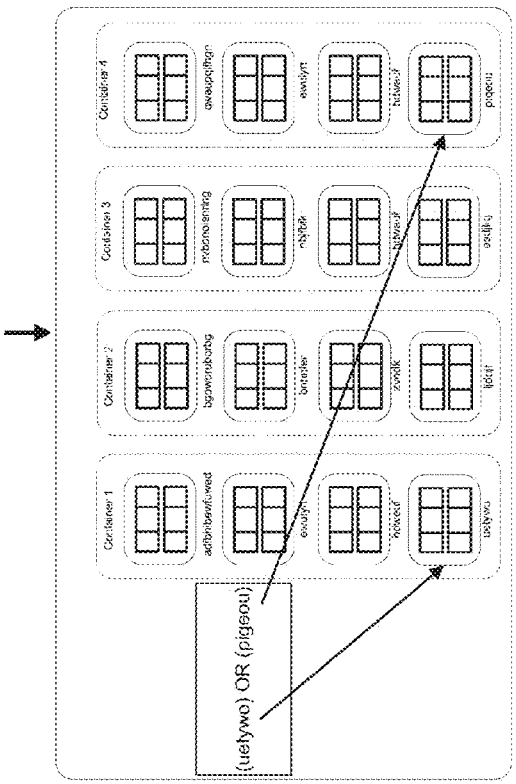

SECURE CLOUD STORAGE DISTRIBUTION AND AGGREGATION

CROSS-REFERENCE TO RELATED APPLICATIONS

This application is a continuation of U.S. patent application Ser. No. 14/741,715, filed Jun. 17, 2015, now U.S. Pat. No. 9,536,103, which is a divisional of U.S. patent application Ser. No. 14/094,484, filed Dec. 2, 2013, now U.S. Pat. No. 9,280,678, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2016, Fortinet, Inc.

BACKGROUND

Field

Embodiments of the present invention generally relate to cloud based data storage. In particular, embodiments of the present invention relate to systems and methods for use of vendor independent secure cloud storage distribution and aggregation.

Description of the Related Art

Computing devices have traditionally executed applications and data services locally on respective devices, in which, as the data is accessed, processed, stored, cached, etc., it may travel within the devices over local buses, interfaces and other data pathways. As a result, users of such devices did not have to worry about interference or exposure of user data unless the device itself was lost or stolen. However, with the growing amount of data that is generated and with the evolution of online/Internet based services and cloud storage platforms, applications, content, and services are increasingly being moved to network providers who perform some or all of a given service on behalf of a user's devices. In such cases, a user may become concerned with who can access, or potentially worse, interfere with, the user's data while it is uploaded to a service, while it is stored by the service, or while it is retrieved from the service.

It has been recognized that while existing cloud storage providers offer a virtually infinite storage capacity, data owners seek geographical and provider diversity in data placement so that they are not tied to a particular service provider and have the flexibility to switch to another provider without losing data or making significant efforts in data transition. Moreover, with the increasing criticality of data being stored, expectations of users to have more reliable mechanisms in place to ensure availability and durability of the content are also on the rise. On similar lines, instead of storing data within a single cloud, it may also be desired by users to store data across multiple cloud platforms to ensure more security, redundancy, and reduction in potential threat of data compromise.

Furthermore, storage of data in an unencrypted format is always at the risk of a network attack that may lead to the data being compromised. Storage of encrypted data, on the other hand, using existing technologies, makes the files, folders, filenames, and content thereof unsearchable and hence unfriendly for user access. Existing encryption techniques also expose the encrypted content to frequency analysis attacks. Moreover, since the could providers control the encryption keys, the data in the cloud can be exposed to attack within the cloud, insider jobs and subpoena—all without the knowledge or consent of the data owner.

Existing techniques for managing distribution and aggregation of content stored by a cloud provider also necessitate service provider and/or vendor specific application programming interfaces (APIs) to be incorporated for storage, access, and processing of the content, making present systems rigid and non-flexible to implementation of policies that allow storage of data across different service providers, allow different cloud storage access rights across users and computing devices, allow searching of downloaded encrypted data across cloud service vendors, among other desired activities.

SUMMARY

Methods and systems are described for vendor independent and secure cloud storage distribution and aggregation. According to one embodiment, a generalized application programming interface (API) is provided by a cloud storage gateway device that is logically interposed between one or more third-party cloud storage platforms and users of an enterprise. The API facilitates storing of files, issuing of search requests against the files and retrieval of content of the files. A file storage policy is assigned by the cloud storage gateway device to each user. The assigned file storage policy defines access rights, storage diversity requirements and a type of encryption to be applied to files for the corresponding user. Responsive to receiving, via the generalized API, a request to store a file, (i) creating, by the cloud storage gateway device, searchable encrypted data corresponding to content of the file and/or metadata associated with the file based on the assigned file storage policy; and (ii) distributing, by the cloud storage gateway device, the searchable encrypted data among one or more third-party cloud storage platforms based on the storage diversity requirements defined by the assigned file storage policy.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 4A-C illustrate an example showing generation of searchable indices from search queries in order to execute search queries on encrypted files in accordance with an embodiment of the present invention.

DETAILED DESCRIPTION

Figure 1:
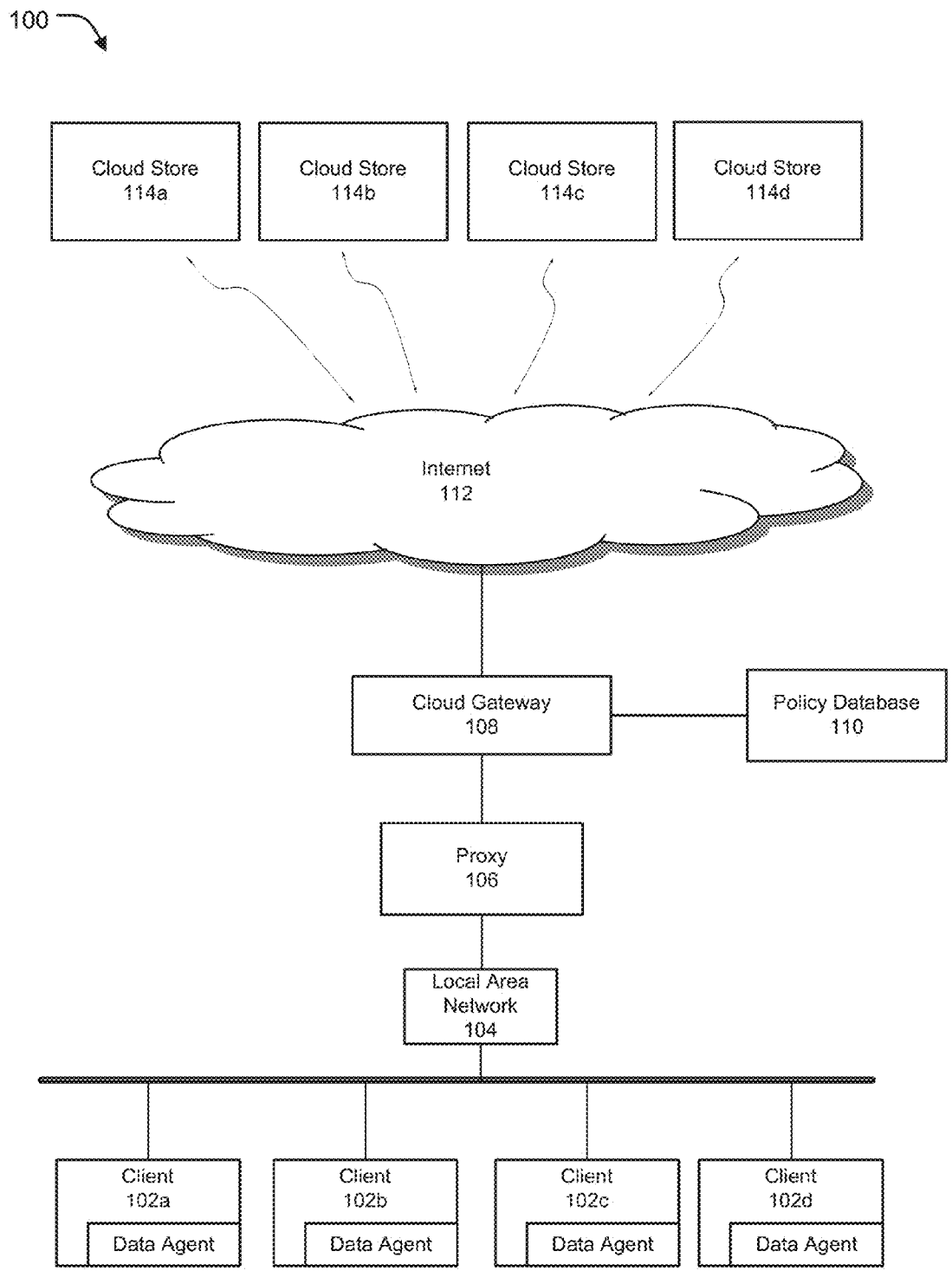
FIG. 1 illustrates an exemplary network architecture in accordance with an embodiment of the present invention in accordance with an embodiment of the present invention.

Systems and methods for a policy-based framework for secure cloud storage distribution and aggregation are described. Methods and systems are also provided for implementing a policy based framework for encrypting, storing, accessing, querying and managing data across one or more cloud platforms. According to one embodiment, a searchable encryption gateway framework provides assignment of a policy from a group of policies stored in a policy database to one or more users such that the policy not only defines the manner in which the users can access and process content stored on the cloud, but can also configure the mode in which the data is encrypted, stored, searched, and accessed to ensure secure and vendor independent cloud management. Embodiments of the system of the present invention can include a policy assignment module, an encryption module, a storage module, and a management module, each of which can be implemented across one or more network devices such as gateway devices, proxy devices, network controllers, among other like devices.

According to one embodiment, the policy assignment module is configured to assign a policy to one or more users, where the policy is selected from a group of policies that are stored in a database. The selected policy can be used for defining the manner in which a file or metadata related thereto is to be uploaded, stored, searched, downloaded, and/or processed in the context of one or more cloud platforms. The selected policy can further be used to configure access rights of the one or more users such that the access rights dictate the manner in which the users can process the uploaded encrypted files. In an instance, a policy can allow a user to download a searchable encrypted file stored in the cloud to a local device such as a mobile phone and search the downloaded encrypted file on the local device for further processing. The policy can further implement key management policies across cloud providers and local devices such that no vendor lock-in is required and a user is given flexibility to transfer content across cloud providers and perform other desired functions that otherwise require vendor specific Application Programming Interface (API). According to one embodiment, a selected policy can be applied to a group of users across one or more organizations such that the policy not only controls the manner in which the content is uploaded, stored, and accessed in the cloud but also manages the rights of a user and the manner in which the user can retrieve and process the files.

According to one embodiment, an encryption module is configured to encrypt one or more files to be uploaded/stored across one or more cloud platforms based on a policy defined by the policy assignment module. In an implementation, a selected policy can be used to define encryption keys, decryption keys, and encryption type, among other attributes for carrying out the encryption of data. According to another embodiment, the encryption module can encrypt each file and/or content thereof using cryptographic key information such that the encrypted content is searchable across cloud platforms, making the encryption architecture independent of the vendor/service provider of the cloud platforms. According to one embodiment, based on the policy defined by the policy assignment module, encrypted files can also be downloaded by one or a group of authenticated users onto a local device such that the downloaded encrypted files are available to offline applications, and hence can be searched, controlled, and managed using the keys generated by the encryption module based on the policy.

According to an embodiment, a storage module is configured to store the searchable encrypted file within the one or more cloud platforms based on policy selected by the policy assignment module. In an implementation, the selected policy can be used to define the manner in which and/or the location at which the file is to be stored (e.g., whether the file is to be stored within a single container or spread across multiple containers and/or whether a copy of the file is to be stored on a local device for offline usage). As the storage module can be implemented independent of the cloud service providers without using application programming interfaces (APIs) exposed by the vendors, the encrypted files can be moved to any cloud platform, thereby avoiding vendor lock-in.

According to another embodiment, a management module is configured to control and manage encryption, storage, access, and processing of cloud storage based on the policy defined by the policy assignment module. In an embodiment, based on user attributes such as the role of the user, a project assigned to the user, the user's need to access the data at issue, among other such attributes, and further based on organization level changes and requirements, a policy identified by the policy assignment module can be dynamically changed or modified at run-time in order to comply with the organization requirements and configure the cloud storage for compliance.

According to another embodiment, the system may further include a mediation module that is operatively coupled with other modules and is configured to mediate vendor specific protocol/APIs thereby facilitating geographical and provider diversity in data placement, making the system agnostic with respect to specific cloud vendor APIs and increasing availability and durability of the stored data. In another embodiment, system of the present disclosure can further include a generalized API module that is operatively coupled with the mediation module and configured to provide a generalized API that can be called by any content/data intensive user application to access content from containers of cloud storage. Generalized API module can allow a single standard thread to multiple users to connect any of their applications with the proposed system and to perform any of storage, upload, retrieval, download, modify, search, and other allied functions at multiple cloud stores of different cloud service providers.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps.

Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present invention may be described using modular programming terminology, the code implementing various embodiments of the present invention are not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms, abbreviations, and phrases used throughout this application are given below.

The phrases "cloud storage service" and "cloud storage platform" generally refer to computer storage space and/or related management provided by a cloud storage service provider.

The phrases "cloud storage service provider" and "cloud service provider" generally refer to a company that provides computer storage space and/or related management to other companies. Examples of cloud service providers include, but are not limited to, Dropbox, Google Drive and Amazon Web Services.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed therebetween, while not sharing any physical connection on with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

The phrase "storage container" generally refers to a file system and/or a user interface concept/metaphor that is used to store, organize or catalogue electronic data and/or electronic files. Some storage containers, such as directories and folders, may include references to other storage containers, such as other directories, folders and/or files. Examples of storage containers include, but are not limited to, directories, directory structures, web directories, folders, smart folders, files and namespaces of same.

Folder—to In computing, a directory is a file system cataloging structure in which references to other computer files, and possibly other directories, are kept.

FIG. 1 illustrates an exemplary network architecture 100 in accordance with an embodiment of the present invention.

System architecture 100 illustrates a plurality of clients 102a, 102b . . . 102n, collectively referred to clients 102 hereinafter, operatively and communicatively coupled to each other through a local area network (LAN) 104. Clients 102, as part of their function, may utilize data, which includes files, directories, metadata (e.g., access control list (ACL) creation/edit dates associated with the data, etc.), and other data objects. Clients 102 may also upload files, search for files or content therein, or even download files as and when desired, wherein during a copy, backup, archive or other storage operation, clients 102 may send a copy of some data objects to a secondary storage computing device by utilizing one or more data agents. A data agent may be a software module or part of a software module that is generally responsible for storage operations, such as copying, uploading, archiving, migrating, download, and recovering data from a data store or other memory location. Each client 102 may have at least one data agent, and system architecture 100 can support multiple clients 102.

According to one embodiment, clients 102 through LAN 104 can be operatively coupled with one or more cloud stores 114a, 114b . . . 114n, collectively referred to as cloud stores 114 hereinafter, through a cloud gateway 108 using Internet 112. Cloud gateway device 108 typically acts as an interface between the clients 102 and stores 114, wherein different file/data read/write requests received from clients 102 can be handled by the gateway device 108 to identify the appropriate set of stores 114 that need to be accessed for processing the requests. Could gateway device 108 can be selected from one or a combination of access management devices, proxy devices, gateway devices, and network controllers, which basically have the intelligence to act as an interface between the clients and cloud service providers. In an embodiment, gateway 108 can be configured with a network attached storage (NAS), wherein NAS provides a way to satisfy incoming data writes from clients 102 quickly, and to buffer or spool data before it is transferred to cloud stores 114. Cloud gateway 108 may further be configured to de-duplicate locally stored data before being written up to cloud stores 114. Clients 102 and applications used thereby can also specify parameters (e.g., under a storage policy) that dictate to the cloud gateway 108 the manner in which their content is to be handled, e.g., how long it is to be retained, whether it be encrypted/compressed, should it be deduplicated, should it be indexed and searchable, should it to be replicated and if so, how many copies and to where, etc. Cloud gateway device 108 may facilitate and/or configure the cloud stores 114 by allowing for metadata to be specified on a per file/object basis or on a data container or bucket basis. Further, the system 100 permits data to be replicated on demand to selected geographies based on access usage patterns, etc. Cloud gateway 108 can also be configured with the intelligence of automatically determining the most optimal cloud store 114 for a given client 102 and then route all files/content from the client 102 to the identified store 114.

Clients 102 may store one or more files, directories, metadata, or parts thereof across one or more cloud stores 114. Clients may also store such content across two or more stores 114 such that the content is divided into multiple chunks and each chunk is stored on a different cloud store 114. According to one embodiment, system 100 of the present invention proposes a vendor independent cloud management architecture such that file chunks are stored across cloud stores 114 that are managed by different cloud service providers. This allows geographical and provider diversity in data placement and avoids any vendor lock-in, leading to increased flexibility and availability.

According to one embodiment, as can be seen in FIG. 1, LAN 104 can be operatively coupled with cloud gateway 108 by means of a proxy 106 that can support multiple protocols such as Hypertext Transfer Protocol Secure (HTTPS), Simple Mail Transfer Protocol (SMTP), Simple Object Access Protocol (SOAP) and File Transfer Protocol (FTP). Proxy 106 can be configured to establish and terminate sessions between clients 102 and cloud stores 114. In an embodiment, proxy 106 can also be configured within cloud gateway 108. In addition to the proxy 106, cloud gateway device 108 can also be operatively coupled with a policy database 110, wherein the policy database 110 can include multiple administrator-configurable policies such that each client 102 is assigned a policy, which is configured to define the rights of the client 102. Such rights not only control the manner in which the respective client 102 encrypts, stores, accesses, and manages files and metadata related thereto, but also the mode in which multiple cloud providers in general interact with the client 102 across one or more cloud platforms. According to one embodiment, a policy can be implemented for a client 102 or a group of clients 102, also interchangeably referred to as users 102 hereinafter, based on their role and responsibility in the organization including other factors relating to the projects they work in, experience they carry, among other attributes. The selected policy can then be used for defining the manner in which the client 102 interacts with multiple cloud storage providers and the access rights he/she possesses to create, upload, store, search, download, and/or process in the context of one or more cloud platforms. In an instance, a policy stored in the policy database 110 can allow a client 102 to download a searchable encrypted file from a cloud store such as store 114a onto a local device, such as client's mobile phone, and then search the downloaded encrypted file on the local device for further processing. According to one embodiment, policies can be used to enforce endpoint protection by, for example, allowing/blocking decryption of downloaded data based on characteristics of the device. For example, an administrator may define a policy for a user that only allows download of decrypted data to company-approved devices or devices that provide a secure container in which to place the downloaded data.

Figure 2:
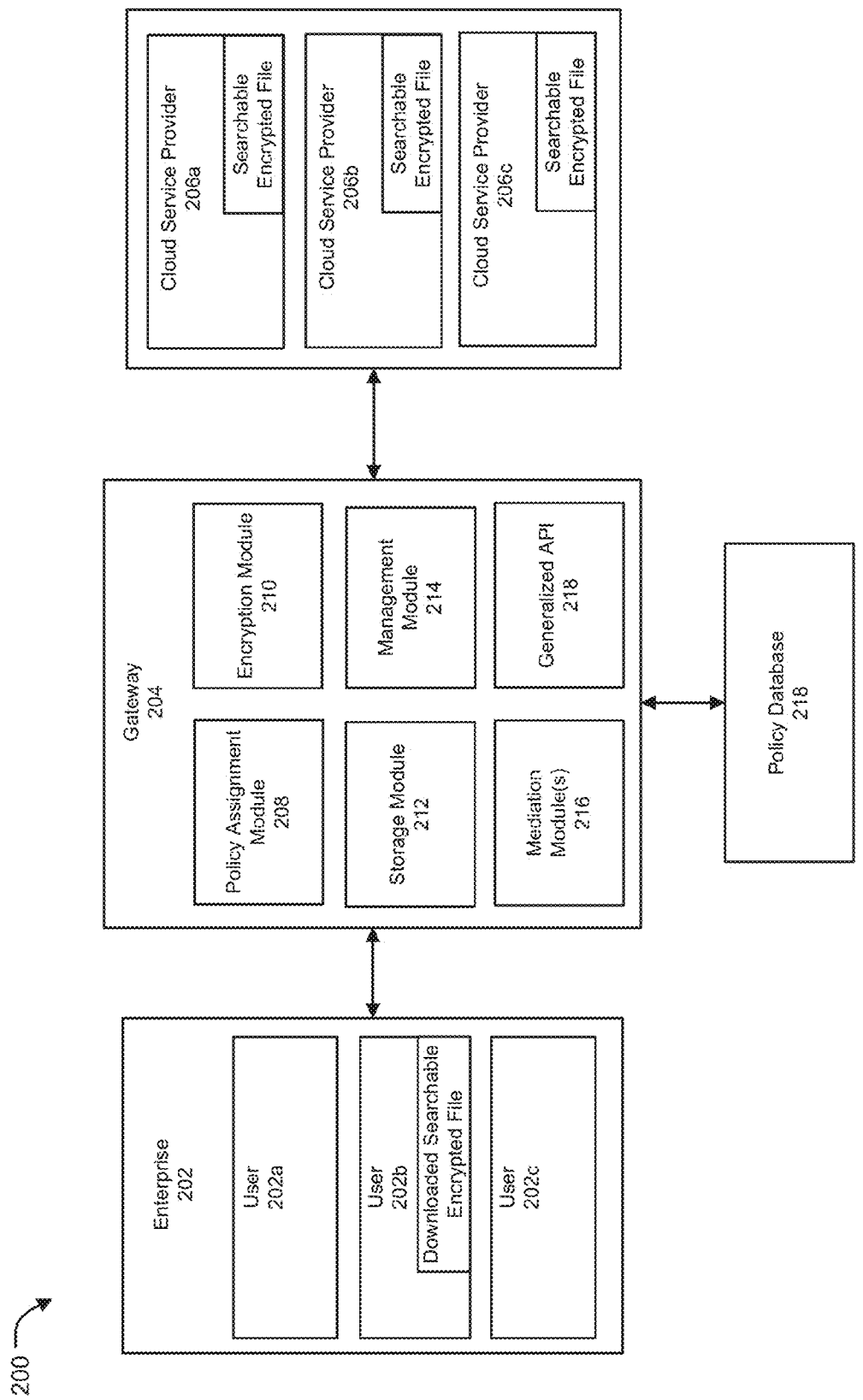
FIG. 2 illustrates exemplary functional modules of the proposed policy-based framework for secure cloud storage distribution and aggregation in accordance with an embodiment of the present invention.

FIG. 2 illustrates exemplary functional modules of a policy-based framework 200 for secure cloud storage distribution and aggregation in accordance with an embodiment of the present invention. Framework 200 of FIG. 2 also illustrates an environment showing interactions between enterprise users and cloud service providers for storage, retrieval, and searching of data and content stored by the providers in their respective cloud stores. According to one embodiment, enterprise 202 can include multiple users 202a, 202b, and 202c, collectively referred to as users 202 hereinafter, who, in an embodiment, may be structurally similar to the clients 102 of FIG. 1. Each user 202 of an enterprise may have a different role and responsibility and hence needs to be given different access rights and privileges to access data and content for evaluation and processing. In an instance, a project manager would need to have access to project related costs, billings, and manpower allocation details, which a project engineer may not need. Enterprise users 202 can be operatively coupled to one or more cloud service providers 206a, 206b, 206c, collectively referred to as cloud service providers 206 hereinafter. According to one embodiment, users 202a-c may be remote users (e.g., connecting to the enterprise network over the Internet or over a private network using some type of remote access connection) or local users.

Cloud service providers 206 may offer free, personal and/or business accounts providing hundreds or more of gigabytes of online storage. Cloud service providers 206 typically provide many distributed storage resources acting as one, provide high fault tolerance via redundancy and/or distribution of data and provide high durability through the creation of versioned copies. Examples of cloud service providers include, but are not limited to, Dropbox, Google Drive and Amazon Web Services.

According to one embodiment, enterprise users 202 can be operatively coupled with the cloud service provider 206 through a gateway 204, which is configured to interface transactions and execute instructions for read/write/search of content between the users 202 and the containers provided by the cloud service providers 206. According to one embodiment, gateway 204 can incorporate multiple functional modules to facilitate transactions between the users 202 and the cloud service providers 206, including but not limited to, a policy assignment module 208, an encryption module 210, a storage module 212, a management module 214, a mediation module 216, and a generalized API module 218. Gateway 204 can further be operatively coupled with a policy database 218, wherein the policy database 218 comprises one or more policies that define the rights and privileges of the users 202 with respect to their interactions with multiple cloud service providers 206 and may further enforce endpoint protection, as described above.

According to one embodiment, policy assignment module 208 is configured to facilitate assignment of a policy selected from the policy database 218 to one or a group of users 202, where the policy to be assigned can be selected, by an administrator, for example, based on the role, responsibility, enterprise practices, among other attributes and can be configured to define the manner in which data, metadata, or any other content, can be accessed and processed by the user or the group of users 202. In one embodiment, a policy not only defines the manner in which files can be uploaded, stored, downloaded, searched, and/or processed in the context of one or more cloud platforms, but also includes any other configurable aspect of the mode in which the user 202 accesses data stored or to be stored in the namespaces, directories, folders, files or other storage containers of one or more cloud platforms. The selected policy can further be used to configure access rights of the one or more users such that the rights dictate the manner in which the users process the files, whether encrypted or unencrypted, for instance.

According to one embodiment, cloud based storage containers can be configured to store the content and/or metadata of encrypted files, wherein gateway 204 can be configured for key management to allow encryption and decryption of content stored on the containers. Policy assigned to a user 202 can also be configured to manage access rights relating to encryption and decryption of content, such that, for instance, one user is allowed to download a searchable encrypted file stored in the cloud onto a local device and search the downloaded encrypted file on the local device for further processing, and another user is not. User-assigned policy can further include key management sub-policies across cloud providers and local devices such that no vendor lock-in is required and a user is given the flexibility to transfer content across varied cloud providers and perform other desired functions that otherwise require vendor specific Application Programming Interfaces (APIs). According to one embodiment, a selected policy can be applied to a group of users across one or more organizations such that the policy not only controls the manner in which the content is uploaded, stored, and accessed in the cloud but also manages the rights of the group of users and the manner in which the users can retrieve and process the files.

According to one embodiment, encryption module 210 is configured to encrypt one or more files to be uploaded/stored across one or more cloud platforms based on the policies assigned by the policy assignment module 208. As the gateway device 204 acts as an interface between the enterprise users 202 and the cloud service providers 206, the gateway 204 can be configured to define and manage encryption keys, decryption keys, and encryption type, among other attributes for carrying out the encryption of content. In an implementation, the gateway 204 can share encryption/decryption keys based on the policy assigned to the user, wherein, for instance, in case a policy does not authorize a user to encrypt files for storage on cloud-based containers, gateway 204 would not share any key details (private/secret and/or public keys) with the user 202.

According to one embodiment, the encryption module 210 can encrypt each file and/or part thereof using cryptographic key information such that the encrypted content is searchable across and within cloud platforms, making the encryption architecture independent of the vendor/service provider of the cloud platforms. Encryption module 210 can further allow a user 202, based on his/her assigned policy, to download searchable encrypted files onto a local device such that the downloaded encrypted files are then available to offline applications and can be searched/managed using the keys generated and processed locally and/or by the gateway 204. As can be seen in FIG. 2, one or more containers (e.g., directories, folders, files and their associated namespaces) of cloud service providers 206 can store metadata and/or content associated with searchable encrypted files, which can be accessed by one or more users, based on the assigned policies. Access to such searchable encrypted files can allow the users to search through the content of the files within the context of the cloud service providers 206 or can also allow the users to download the encrypted files onto their local devices such as laptops, PCs, mobile device, smart phones, tablet PCs, portable computing devices, among other like devices, as has been done by user 202b of FIG. 2, wherein the user 202b has downloaded the searchable encrypted files on respective local device, which would then allow the user 202b to search metadata and/or content associated with the searchable encrypted files even in offline mode when cloud service providers 206 are inaccessible via a network connection, for example.

For purposes of brevity, examples of searchable encrypted files are described in which the encrypted version of the name of the original file requested to be stored in the cloud is used as all or a portion of the name of a folder containing one or more files having stored therein the encrypted textual content of the original file. Hashes of one or more search terms may be used to form the file names to provide searchable indices. In other embodiments, the files may be zero-sized files and the file names themselves may represent all or a portion of the cipher text (e.g., encrypted content of the original file).

In yet another embodiment, full text and/or regular expression search capabilities may be provided. For example, full text search-aware encryption may be supported in a cloud storage service provider-agnostic manner by automatically processing, by the cloud gateway (e.g., cloud gateway 108 or 204), data associated with a file requested to be stored in the cloud and creating desired meta-data to enable search before distributing the data among one or more cloud service providers. The cloud gateway may store an additional small amount of meta-data for multi-user access control and sharing purposes and send the encrypted data and meta-data to the cloud for permanent storage. In this manner, end-users may later search for any keyword, term, or expression in the uploaded files effectively with no information leakage to the cloud providers. Further improvements to the remote processing ability can be provided by handling complex regular expressions and/or Boolean logic-based formulas. For example, in the case of Health Insurance Portability and Accountability Act (HIPAA) data storage applications, a hospital doctor may be interested in patient data records where a patient's age is between 10 and 30 and their records contain the term "diabetes." Additionally, it is desirable to allow users to perform searches using the full power of regular expressions, allowing fuzzy matching, and searching records in multiple formats automatically.

Empirical data suggests with about five percent overhead the cloud gateway can create an ordered index that is fully searchable to support both regular expression and full text search capabilities. In connection with testing of a prototype system implementing an embodiment of the present invention, "Programming Python," by Mark Lutz was analyzed and found to contain a total of 542,259 words of which 51,842 were unique words (including numbers and symbols). This rough count includes many duplicates, so it can be viewed as an upper bound. Regardless, indexing of such a document is easy. A full accounting (in clear text) of all words and their counts is 994 KB for a 27 MB PDF.

Most words deduplicate well. Therefore, in one embodiment, a finer representation of a text file may be created based on a deduplicated document for regular expression and n-gram based searches. For example, if each word were represented by a hash of n-bits, and assuming ~50 k unique words in a book, it is estimated that no more than 5,000,000 hashes would be needed to prevent collision over an average document or set of documents, so 3-bytes per word is more than sufficient.

In one embodiment, to run a regular expression on a document, both the encrypted document and the ordered index are downloaded from the cloud. Then, the cloud gateway determines if any combination of words satisfies the regular expression. Finally, the search run on the deduplicated hash document, by hashing the words. This is the same basis for full text search capability. A simplified example of how searchable encrypted files may be created and processed by a searchable encryption engine for executing search queries is described further below with reference to FIGS. 3A-B.

Figure 3A:
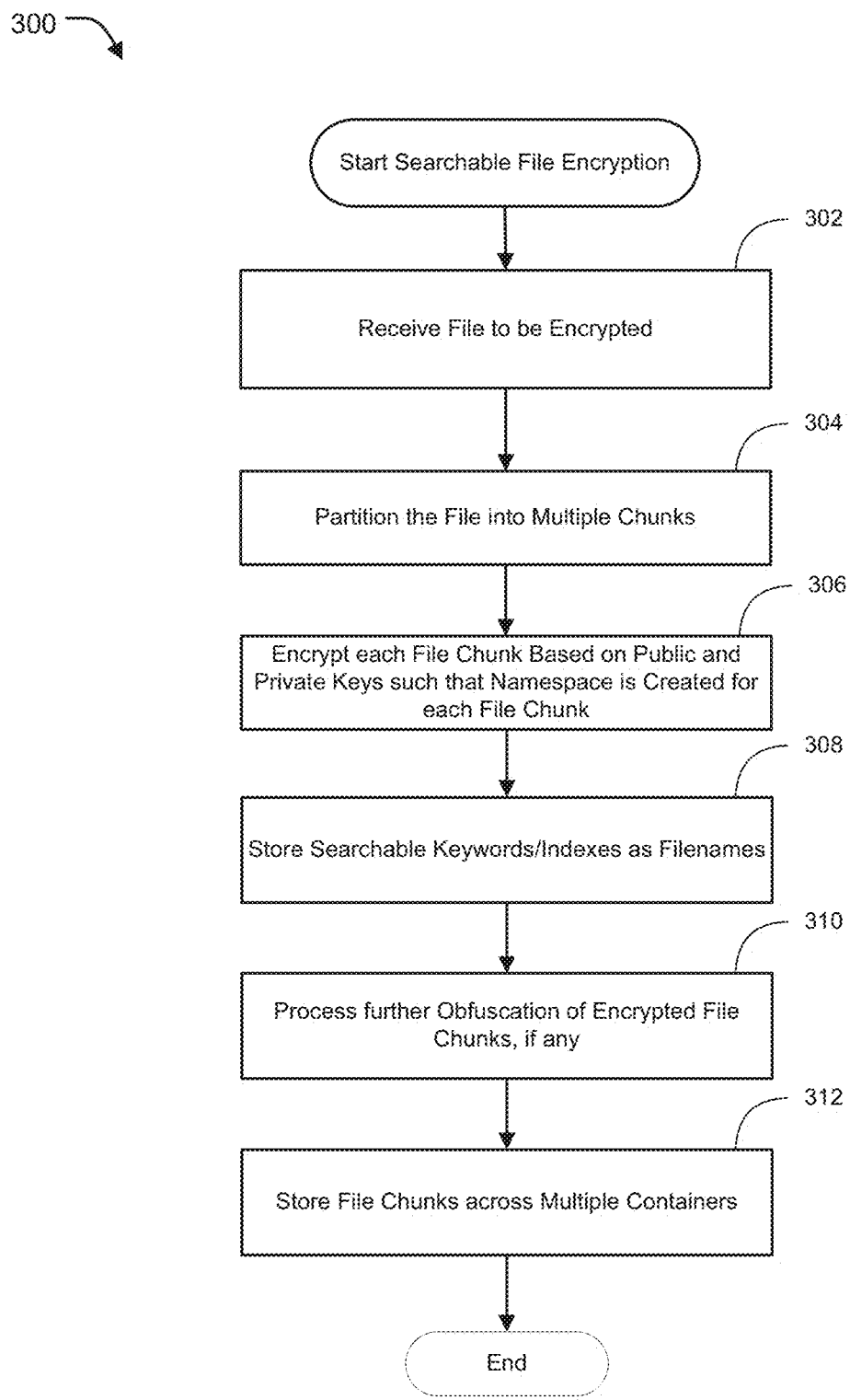
FIG. 3A illustrates an exemplary flow diagram for generating searchable encrypted files in accordance with an embodiment of the present invention.

FIG. 3A illustrates a flow diagram for generating searchable encrypted files in accordance with an embodiment of the present invention. According to one embodiment, the security engine used by the searchable encryption framework is based on encryption of file names and file obscurity in the cloud as described in Appendix A, whereby each file in the user space is chunked and each chunk corresponds to an individual file in the encrypted cloud space. Encrypted files may be spread evenly or otherwise over arbitrary file name sets, to further obfuscate the search space, with the option for file padding, or the random creation of empty files in the sequence to further prevent data leakage. Chunks from a single file can be distributed across separate cloud storage service providers. The methods described herein further allow the data to be searchable despite being encrypted, thereby not breaking existing application functionality. In one embodiment, the searchable encryption framework also offers a generalized API to upload files, and search for files by name and no additional provider-specific functionality is needed to provide searchable encryption, deduplication, and tokenization.

At step 302, a file to be encrypted can be received by gateway device 204 from an enterprise user 202. Such a file can be received based on policy assigned to the user and rights defined in the policy. At step 304, the file can be partitioned into one or more chunks, wherein chunk size can be pre-defined or dynamically determined by the encryption module 210 or any other module of the gateway 204. Chunk sizes can also be different for each user/file/enterprise such that a file can be partitioned into multiple chunks of varied sizes based on one or a combination of file contents, characteristics of the file content, policy assigned to the user, attributes of cloud stores in which chunks are intended to be stored, among other parameters. For instance, a chunk can be as small as a record in the file and as large as the whole file itself.

At step 306, each chunk can be encrypted based on public and private/secret keys defined by the encryption module 210. In an exemplary implementation, each chunk R can be encrypted based on a public key P using a function Encrypt (P, R) to generate cipher text, C, by the following equation:

C←F Encrypt (P, R), if predicate=1
C←F Encrypt (P, 0), Otherwise

According to one embodiment, the cipher text, C, can be decrypted using an appropriate secret/private key, S, defined by the encryption module 210.

At step 308, indices, also referred to as keywords hereinafter, which would typically be used as search terms in the form of search queries are stored as filenames of the chunks. For instance, in a medical record that states, "Peter is an Asian having Diabetes", possible search keywords can be "Peter", "Asian", and "Diabetes" and therefore indexing can be done on these three keywords such that they are stored in an searchable yet ciphered format. For instance, searchable index for "Peter" can be generated by the encryption module 210 as "uetywo". Likewise, "Diabetes" can be indexed as "hdweuf", which is again searchable after the keywords are generated as searchable indices by the encryption module 210.

At step 310, further obfuscation can be processed on the encrypted file chunks by options such as file padding or random creation of empty files, which can further prevent data leakage. Any other known technique for enhancing encryption of file chunks can also be implemented and is well covered within the scope of the present disclosure. At step 312, the encrypted chunks are finally stored across one or more cloud-based containers. In an implementation, gateway 204 can be configured to store file chunks such that contiguous chunks are not stored together, and instead, are stored on containers provided by different cloud service providers.

Figure 3B:
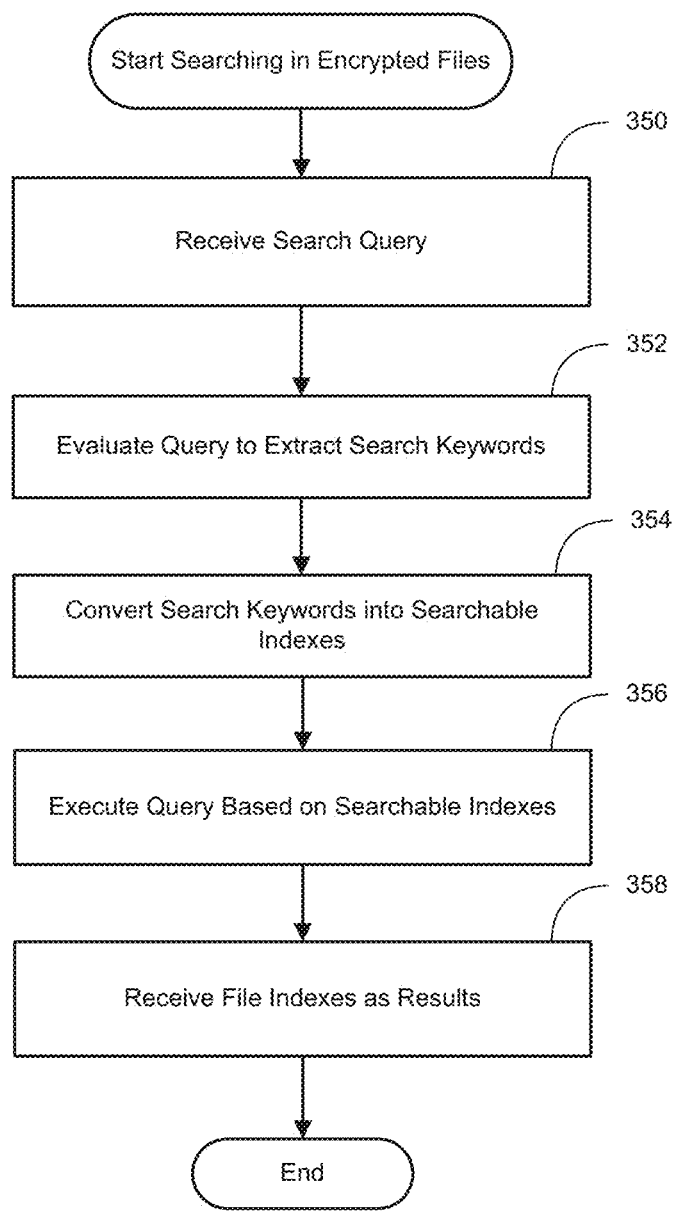
FIG. 3B illustrates an exemplary flow diagram for processing search queries for searching encrypted files in accordance with an embodiment of the present invention.

FIG. 3B illustrates an flow diagram for processing search queries for searching encrypted files in accordance with an embodiment of the present invention. At step 350, the gateway device 204 receives a search query, wherein the search query can define elements and keywords to be searched based on defined constraints. For instance, a search query can be defined as "Select Details based on Name, wherein the Name is "Ronn" OR "Eric". At step 352, keywords being searched are evaluated and extracted. For instance, for the above mentioned search query, the keywords may include "Ronn" OR "Eric". Other attributes of the search query, including but not limited to the constraints defined in the query can also be evaluated. At step 354, each extracted keyword can be converted into searchable indices by the encryption module 210. Searchable indices, as mentioned with reference to FIG. 3A can be stored within file names of multiple file chunks. For instance, search keyword "Ronn" can be indexed as "uevbwq" and Eric can be indexed as "uastyb".

At step 356, the modified search query can be executed based on the searchable indexed formed from the search keywords. In an instance, instead of "Ronn" OR "Eric", the modified search query can be "uevbwq" OR "uastyb", which once formed can then be run on one or more containers of the cloud service providers 406, which store the file chunks. At step 358, chunks having matching indices can be returned as the result set. As multiple file chunks can have the same searchable index, multiple chunks can be returned as results from different containers.

FIGS. 4A-C conceptually illustrate the generation of searchable indices from search queries in order to execute search queries in encrypted files in accordance with an embodiment of the present invention. FIG. 4A shows multiple containers (1-4), which may stored within a single cloud service provider or across multiple cloud service providers. Each container can include multiple encrypted file chunks, which may be named by means of searchable indices as mentioned in connection with the description of FIGS. 3A-B. For instance, container 1 can include four file chunks having their names (adfbhlbewfuwed, ewuiyrt, hdweuf, and uetywo). In the present example, the top-most portion of each container may represent a folder within which the other portions are included in the form of files. The name of the folder may be the encrypted version of the original file name and the names of the files may include one or more searchable indices.

Size of each file chunk and/or each container can be varied and stored such that optimal processing can be done on the file chunks with minimum latency. In an instance, while allocating file chunks to containers, each chunk can be assigned a weight based on the content it represents, importance of the chunk, among other parameters, and then be allocated, based on its weight, to the least weighted container, which may allow minimal latency in access of the chunk.

FIG. 4B shows the same set of four containers, each having four file chunks that may be named using searchable indices. The figure further represents a search query, "Ronn" or "Eric", wherein Ronn and Eric form part of the keywords to be looked out for from the one or more containers. As is illustrated in FIG. 4C, keywords "Ronn" and "Eric" are converted, by the encryption module 210, into searchable indices (uetywo) OR (pigeou), which are then executed as part of the search query on the one or more containers. As can also be seen in FIG. 4C, two file chunks, one in container 1 and the other in container 4, match the search indices and can therefore be returned as part of the result set. In an implementation, the searchable indices can be defined in the gateway device 204 and then sent to one or more relevant set of containers in the form of a query. Alternatively, in cases of downloaded encrypted files on local devices, search keywords can also be indexed within the local device itself by using key management implemented by the policy assigned to the user, and the indexed terms can then be searched on the local database itself.

Referring back to FIG. 2, according to one embodiment, storage module 212 is configured to store the files and/or other content, including but not limited to searchable encrypted files, within the one or more cloud platforms and/or containers of the cloud service providers 206 by one or more users 202 based on their respective policies. In an implementation, a policy can be used to define the manner in which and/or the location at which a file is to be stored (e.g., whether the file is to be stored within a single container, or divided into chunks and stored across multiple containers and/or whether a copy of the file is to be stored on a local device for offline usage). Gateway 204, through the storage module 212, can also dynamically change the configuration of file storage so as to store the content optimally at any given instant. As the gateway 204 can automatically change the storage pattern across one or more containers of cloud service providers 206, enterprise users 202 do not have to worry about changing their providers in order to find a more optimal solution, from a cost, bandwidth, latency, and other allied standpoints. As the storage module 212 can be implemented independent of the cloud service providers without using application programming interfaces (APIs) exposed by the vendors, files stored by such vendors can be moved to any cloud platform at any moment, thereby avoiding vendor lock-in.

According to another embodiment, management module 214 is configured to control and manage encryption, storage, access, and processing of cloud storage based on the policy defined by the policy assignment module 208. As management module 214 is configured to manage all functions relating to storage, transfer, access, processing, and search, among other functions, the module 214 may be operatively coupled with all other functional modules of the system 200. As roles, responsibilities, and other user attributes keep changing periodically, the management module 214 can be configured to factor all such parameters including service quality of cloud service providers 206, storage capacity anticipated, and change in policies, among others and modify the cloud-based content storage and access patterns at run-time in order to comply with the organization requirements and desired performance levels.

According to another embodiment, mediation module 216 is operatively coupled with other functional modules and is configured to mediate vendor specific protocols/APIs with gateway 204 so as to allow the gateway 204 to facility a vendor lock-in free environment for users 202, thereby facilitating geographical and provider diversity in content placement, making the system agnostic with respect to specific cloud vendor APIs and increasing availability and durability of the stored data. Mediation module 216 can be configured to dynamically detect changes in vendor specific protocols/APIs and change configurations in the gateway 204 so as to allow the gateway 204 to optimally process user transactions for data storage, transfer, and retrieval at any time.

According to another embodiment, gateway 204 can include a generalized API module 218 that is operatively coupled with the mediation module 216 and configured to provide a generalized API that can be called by any content/data intensive user application. For instance, user applications relating to database, project management, finance, and strategy development are typically content centric and can accordingly be operatively coupled with the gateway 204 by means of the generalized API module 218 so as to enable the gateway 204 to, based on the mediation module 216, enable the content from such applications to be efficiently stored across cloud-based containers. In sum, the generalized API module 218 allows a single standard thread to multiple users to connect any of their applications with the gateway 204 to perform any of storage, upload, retrieval, download, modify, search, and other allied functions at the cloud stores.

Figure 5:
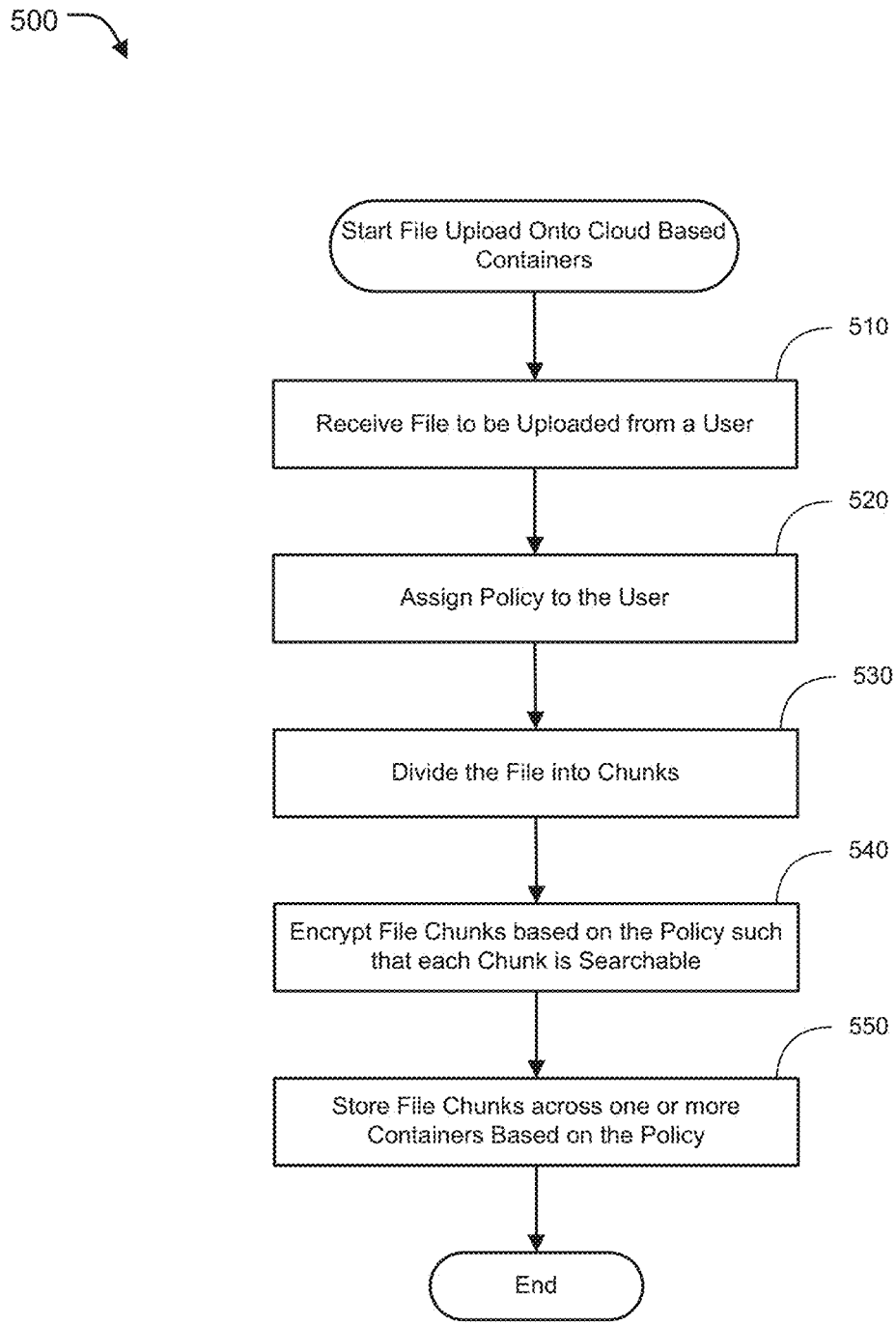
FIG. 5 illustrates a flow diagram for uploading one or more files onto multiple containers provided by one or more cloud storage providers in accordance with an embodiment of the present invention.

FIG. 5 illustrates a flow diagram 500 for uploading one or more files to a plurality of containers provided by cloud storage providers in accordance with an embodiment of the present invention. At step 510, a file to be uploaded by a user can be received at a gateway device. At step 520, the gateway device can check whether a policy exists for the concerned user, which if present, is assigned to the user. In case no policy exists for the user, an appropriate policy can be identified for the respective user and accordingly assigned, based on which the file uploading process is carried out. At step 530, the received file can be divided into multiple chunks of same or varying sizes, wherein in an implementation, the complete file is taken as a single chunk and uploaded onto a container provided by a cloud-based providers, and in another implementation, the file is broken into numerous chunks, which are then stored across one or more containers.

At step 540, each file chunk is encrypted based on the policy assigned to the user. It would be appreciated that it is not necessary to encrypt a file before storing it on the cloud storage, but the same may be preferred. It also to be appreciated that storing of files and/or metadata related thereto based on the user assigned policy, without encryption, is also covered within the scope of the present invention. Furthermore, in an implementation, files can be encrypted such that they are searchable by a user having the appropriate rights to do so. In yet another embodiment, only a partial set of file chunks can be encrypted, while the other set may not be encrypted. At step 550, encrypted file chunks can be stored on a single or a combination of containers of multiple cloud service providers. As mediation takes place between the APIs of multiple cloud service providers and cloud gateway of the present disclosure, any file chunk can be uploaded to any container that is accessible by the gateway. A gateway can also categorize or assign weights to cloud service providers based on their priority, response time, feedback, performance, and other evaluation parameters and accordingly upload chunks by choosing the most optimal set of containers. For instance, file chunks having higher weights/priority can be allocated to more secured containers. It should be appreciated that any other change in parameters based on which allocation of files to containers takes place is within the scope of the present disclosure.

Figure 6:
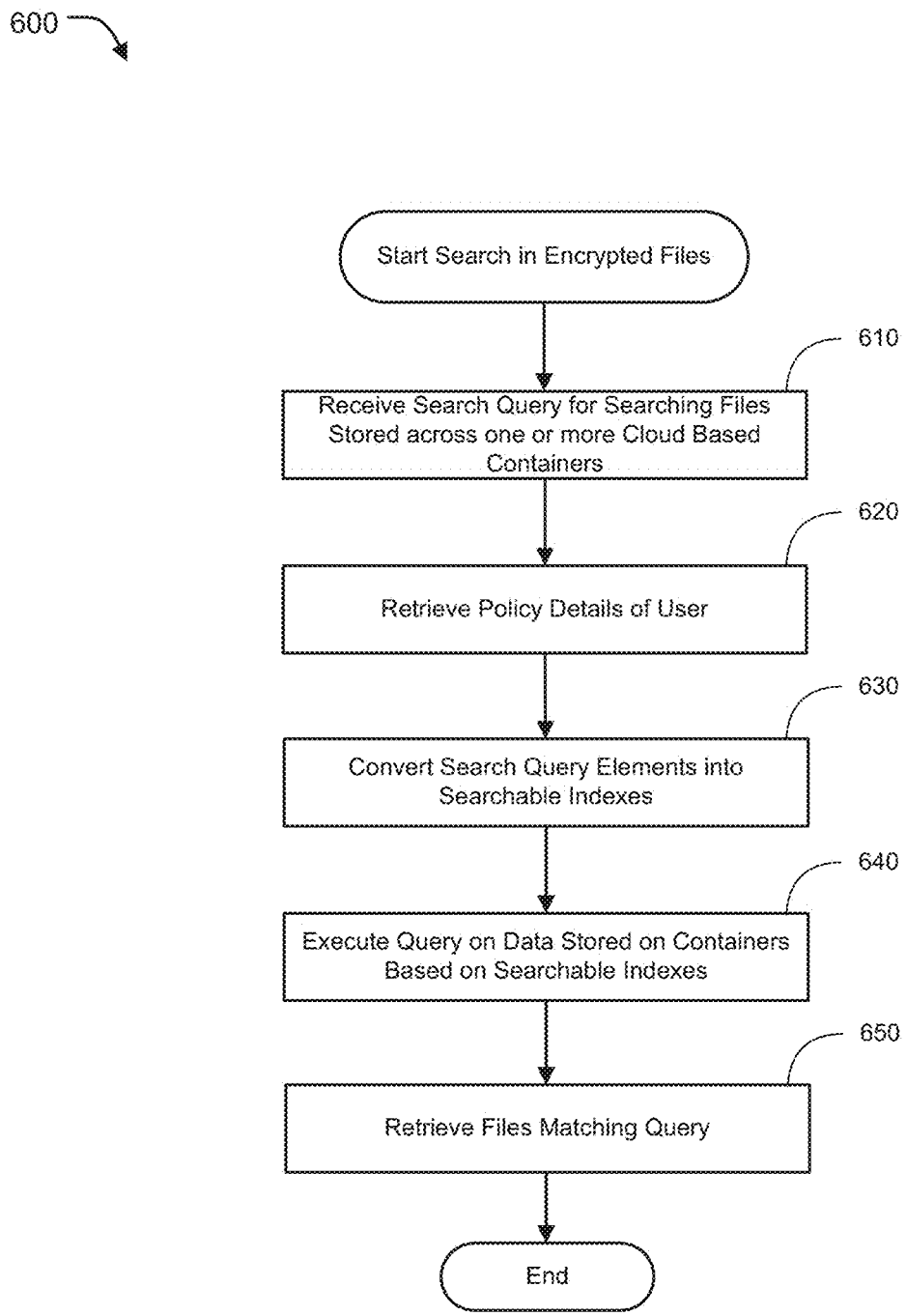
FIG. 6 illustrates a flow diagram for executing search queries on encrypted files stored as one or more containers provided by cloud storage providers in accordance with an embodiment of the present invention.

FIG. 6 illustrates a flow diagram 600 for executing search queries on encrypted files stored on one or more containers provided by cloud storage providers in accordance with an embodiment of the present invention. At step 610, a search query is received from a user, wherein the search query defines one or more elements along with constraints, which need to be matched with data stored on cloud-based containers. At step 620, policy associated with the user is evaluated to assess whether the user has the rights to execute a search on the containers. As such access rights may be partial, a user, based on the assigned policy, may be allowed to search in a partial set of containers. In case a user is not assigned a policy, gateway may be configured to check the profile of the user and accordingly assign an appropriate policy to define access rights and privileges of the user while interacting with multiple cloud-based platforms. At step 630, the received search query can be divided into multiple query elements and subsequently converted into searchable indices. An exemplary conversion of search keywords/elements to searchable indices has been explained previously with reference to FIG. 3B.

At step 640, the searchable indices can be executed by the gateway device so as to retrieve matching file chunks stored in containers of cloud storage. At step 650, the matching file chunks can be retrieved and presented to the user. It should be appreciated that the above flow diagram is completely exemplary in nature and any change in configuration and structure of the file being searched, or policy based on which the search is conducted is within the scope of the present disclosure. For instance, in case the user assigned policy does not allow retrieval of the complete file chunk but only a part therefore, the step 650 may be configured accordingly to extract only the authorized file chunk portion for subsequent presentation.

Figure 7:
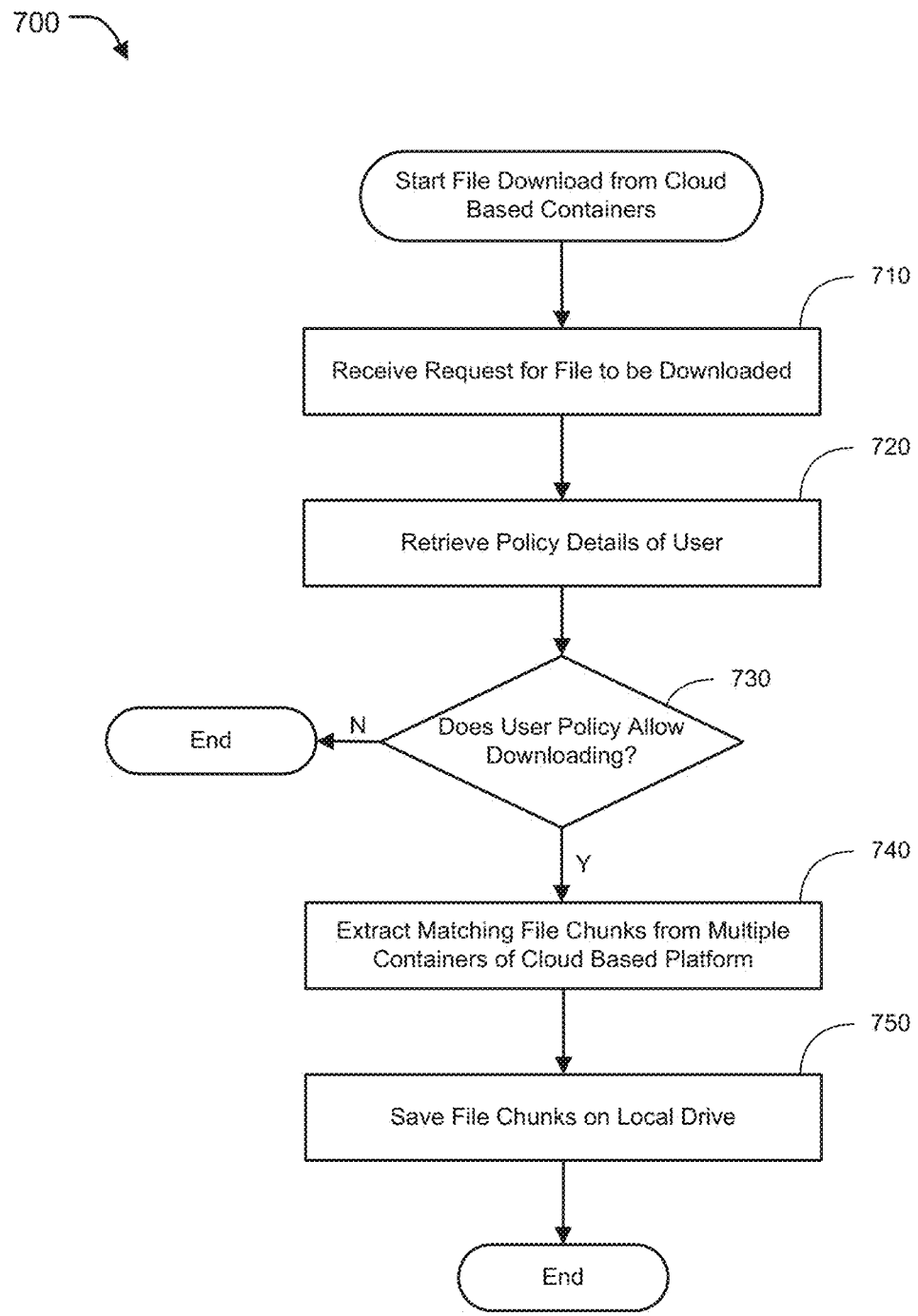
FIG. 7 illustrates a flow diagram for downloading files from cloud-based storage containers in accordance with an embodiment of the present invention.

FIG. 7 illustrates a flow diagram 700 for downloading files from cloud-based storage containers in accordance with an embodiment of the present invention. At step 710, a request for file(s) to be downloaded is received by gateway device from a user. At step 720, policy details of the user that has requested for file download are retrieved to evaluate whether user has the required authorization and rights to make such a request and download the requested set of files. In case, for instance, from the requested set of files, only a partial set has been authorized to the user, the gateway device accordingly processes the request and negates the remaining set of files. At step 730, it is checked for whether the user policy allows downloading of requested set of files, wherein in case the policy does not allow, the method ends. At step 740, in case the user policy allows downloading of files, the gateway processes the request by checking the location at which each file is stored and accordingly retrieves the files from the identified locations. In case one or more of the requested files are stored as chunks, the gateway can be configured to extract each file chunk of the relevant file from one or more containers and combine them to form the desired file. At step 750, the files and/or chunks thereof can be saved onto the local drive.

According to one embodiment, files requested for downloading may include one or more searchable encrypted files, in which case, the gateway, upon receiving such a request, identifies location of the encrypted files and downloads the searchable encrypted files onto the local drive, in order to enable the user to search the encrypted file offline without being connected to cloud based containers or even the gateway device, for instance.

Figure 8:
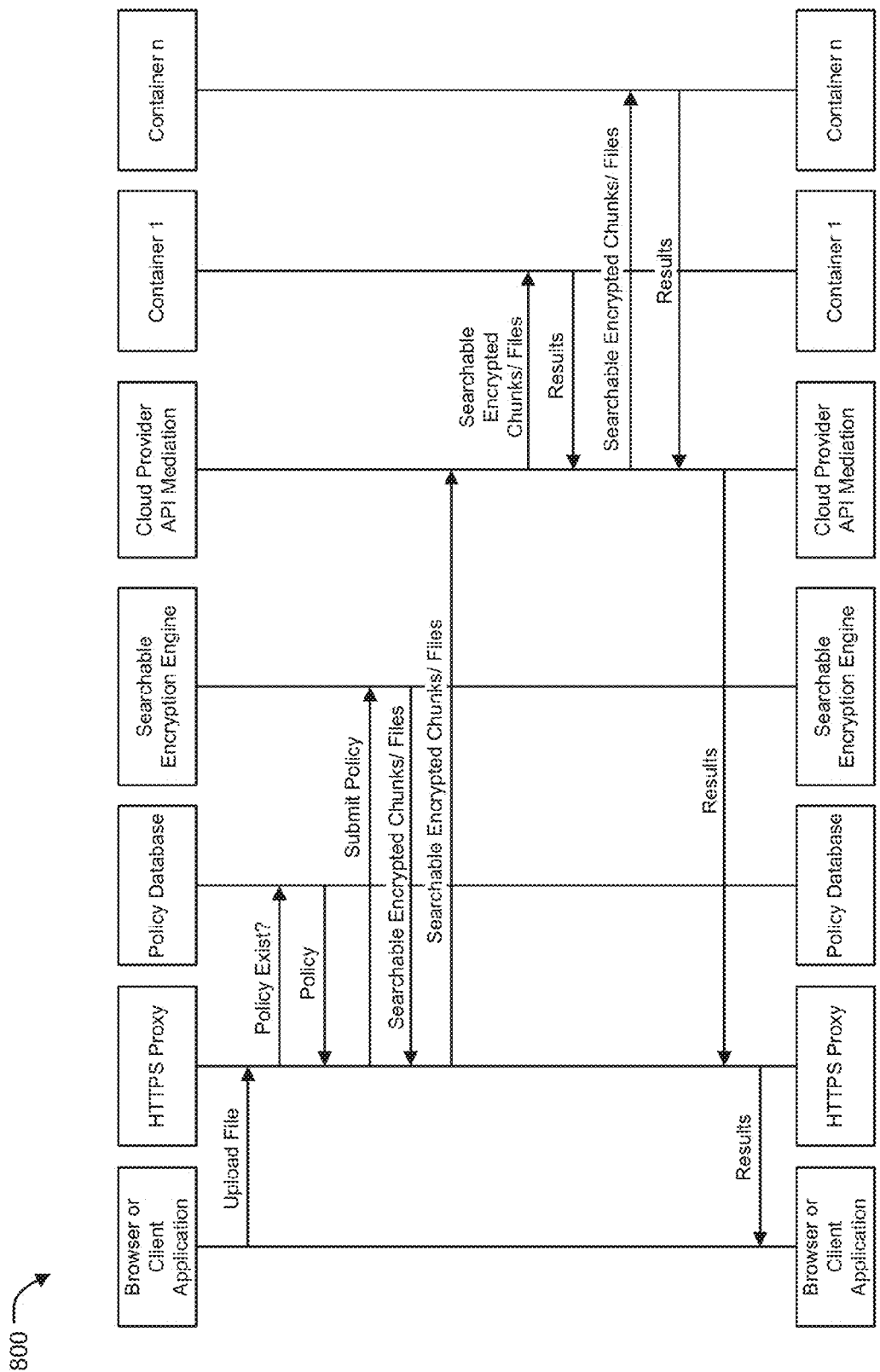
FIG. 8 illustrates a sequence diagram for uploading files to cloud-based storage containers in accordance with an embodiment of the present invention.

FIG. 8 illustrates a sequence diagram 800 for uploading files to cloud-based storage containers in accordance with an embodiment of the present invention. As can be seen, multiple structural elements including client application/browser, proxy, policy database, searchable encryption engine, cloud provider API mediation, and a plurality of containers are present in the architecture of the proposed system. As the function of each structural element has been explained in detail above, the same is not being repeated for brevity of the disclosure. It would also be appreciated that multiple structural features may form part of a single network device. For instance, gateway device of the present disclosure can include the searchable encryption engine and the cloud provider API mediation within itself. Furthermore, although policy database can also be incorporated within the gateway device, the database can also be an external database and operatively coupled with the gateway device. As can be seen in the sequence diagram, upload sequence flow can be initiated by a user, through his/her client application, by sending a file upload request to a gateway, which is operatively coupled with the policy database of the proposed architecture. The gateway device can be accessible to the client by use of a proxy, such as a HTTP proxy, which sets up and terminates sessions between client applications and gateway interface.

As a next step, upon receiving the request, the gateway device, through the policy database checks for whether a policy exists for the user and assigns the appropriate policy to the user based on parameters including but not limited to, role and responsibility of user in the enterprise and years of experience. The user can then, through the HTTPS proxy, submit the assigned policy to the gateway and, using the searchable encryption engine of the gateway, partition the file to be uploaded into chunks. It would be appreciated that partitioning the file into multiple parts/chunks is not compulsory and is shown only as an exemplary embodiment of the present system. A file can therefore always be directly uploaded onto a container provided by a cloud service provider without being partitioned into chunks.

As illustrated in FIG. 8, searchable encryption engine can be configured to divide the file to be uploaded into multiple chunks, and then encrypt each chunk such that the chunk is searchable. Once the client, through the HTTP proxy, receives the encrypted file chunks, the same can be sent the cloud provider API mediation, which mediates with the vendor specific APIs of one or more cloud service providers to allow the user access a vendor lock-in free environment to upload and process files. Once the mediation process with the desired set of cloud providers is complete, the gateway can be configured to upload each file, whether in chunks or not and whether encrypted or not, onto one or more containers. Confirmation of the successful upload of the files on the containers can then be given back to the user along with details of the containers on which the files are stored.

Figure 9:
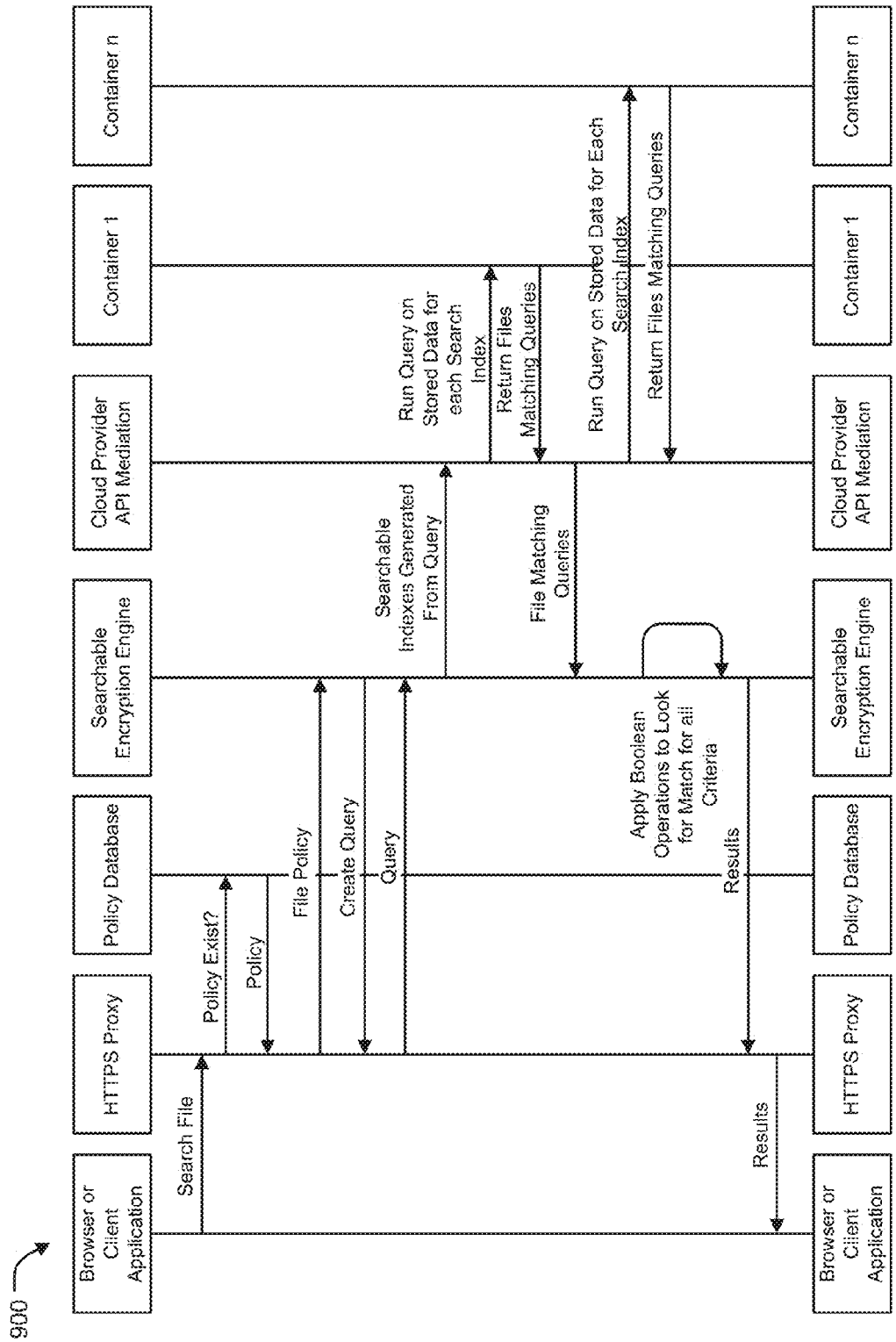
FIG. 9 illustrates a sequence diagram for searching searchable encrypted files that are stored in cloud-based storage containers in accordance with an embodiment of the present invention.

FIG. 9 illustrates a sequence diagram 900 for searching in searchable encrypted files that are stored in cloud-based storage containers in accordance with an embodiment of the present invention. As can seen, a user initiates the sequence flow by indicating, through a HTTP proxy, a file or content therein to be searched for. In response to the above search request, the gateway device determines whether the user has a policy associated thereto and whether the assigned policy allows the user to search for the intended content. In case the user-assigned policy allows a user to execute search for the desired content, the searchable encryption engine enables the user to create a search query, and then process the created query that comprises multiple keywords and constraints so as to generate a set of searchable indices (an example of which has been described with reference to FIG. 3B). The gateway device can then, upon generation of the searchable indices, run the query based on such indices on one or more containers and extract files or chunks thereof that match the queries. In an embodiment, as the gateway device may be aware of the containers on which the content/files would be stored, it need not execute the index-based search queries on all the containers but rather only on a set of containers that are known to contain relevant content. Results obtained from one or more containers after executing the index-based queries can then be processed using Boolean operations to result in a final set of results that can then be reported back to the user.

Figure 10:
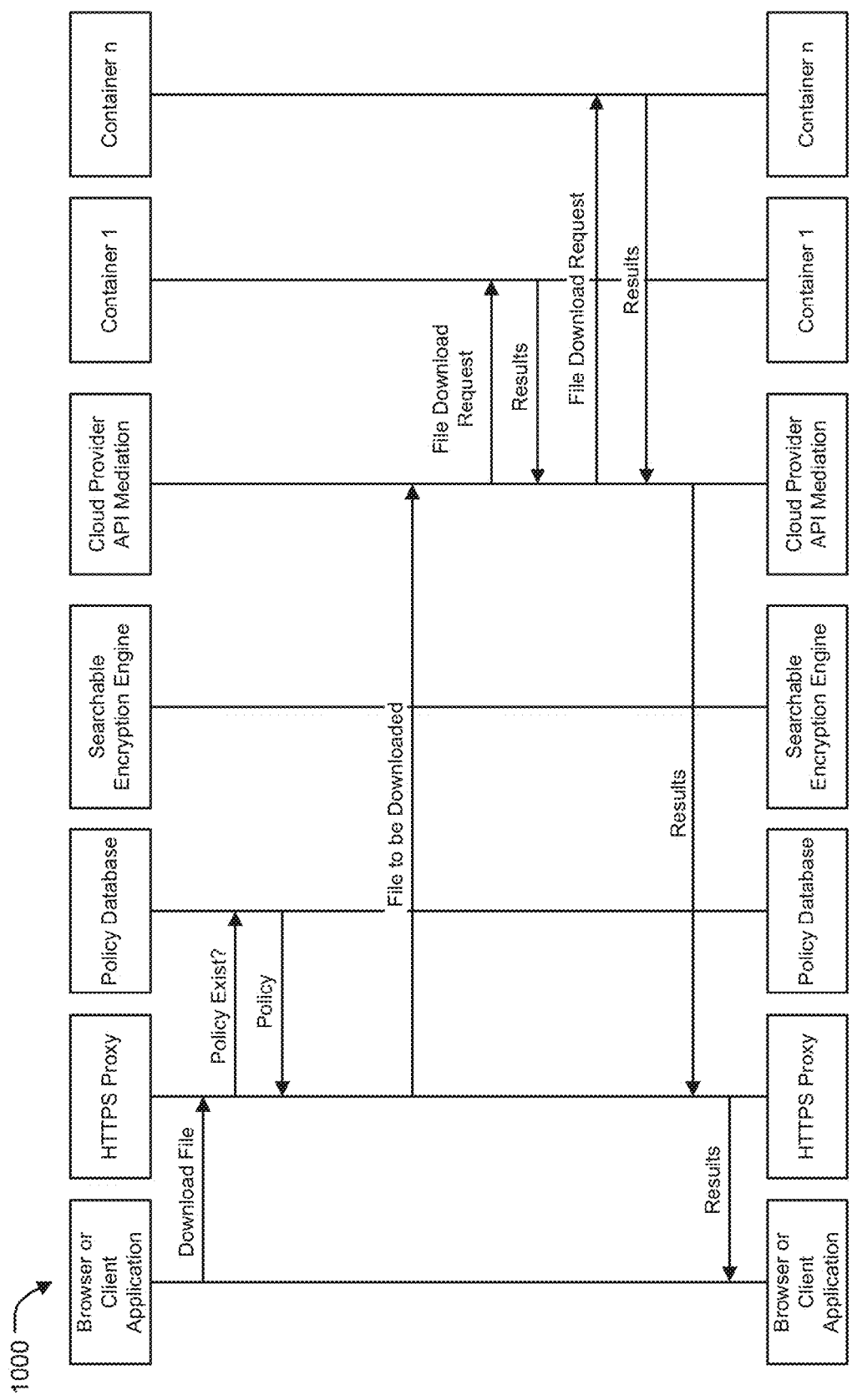
FIG. 10 illustrates a sequence diagram for downloading files from cloud-based storage containers onto local drives/discs in accordance with an embodiment of the present invention.

FIG. 10 illustrates a sequence diagram 1000 for downloading files from cloud-based storage containers onto local drives/discs in accordance with an embodiment of the present invention. As can seen, a user initiates the sequence flow by indicating a file or a part thereof to be downloaded onto the local drive. After receiving a file download request, the gateway device can be configured to evaluate whether the policy assigned to the enterprise user allows or gives him/her the right to download the requested file. Once the policy is evaluated and it is confirmed that the user is authorized to download the file, the download request can be forwarded by the gateway device to the mediation module so as to allow the module to assess the container(s) on which the file resides, map the APIs of the cloud service providers of the respective container(s), and then send the request for downloading to the container(s). In case the file requested for downloading has been divided into multiple file chunks, with each chunk being stored on a different container, multiple file chunk download requests can be sent by the gateway device to the respective set of containers. Results from the containers can then be evaluated to confirm that they relate to the intended file, and then subsequently returned back to the client.

According to one embodiment, systems and methods of the present disclosure provide a cloud storage gateway device that is logically interposed and operatively coupled with one or more third-party cloud storage platforms on one side and a plurality of users of an enterprise on the other side. Systems and methods further provide a generalized application programming interface (API), by means of a generalized API module 218, through which the plurality of users can store files to the one or more third-party cloud storage platforms, issue search requests against the files, and retrieve content of the files.

According to another embodiment, the gateway device can be configured to assign a file storage policy from a plurality of file storage policies that are stored in a policy database to each user of the plurality of users, wherein the plurality of file storage policies define the access rights, storage diversity requirements, and type of encryption to be applied onto the files. In an exemplary implementation of the present system and method, the gateway device can be configured to receive, through the generalized API, a request to store/upload a file from a user and create searchable encrypted data corresponding to one or more of (i) content of the file and (ii) metadata associated with the file, wherein the upload request is associated with a first user of the plurality of users and the searchable encrypted data is, based on the type of encryption defined by the file storage policy, assigned to the first user. Gateway device can further be configured to distribute the searchable encrypted data among the one or more third-party cloud storage platforms based on the storage diversity requirements defined by the assigned file storage policy by uploading a subset of the searchable encrypted data to the one or more third-party cloud storage platforms.

According to another embodiment of the present disclosure, gateway device can also be configured to receive, through the generalized API, a request to search content of a file or metadata associated with the file. In order to implement the same, gateway device can be configured to check whether the search request is authorized based on the access rights defined by the file storage policy assigned to a user of the plurality of users with which the search request is associated, wherein, in case the search request is authorized, the gateway device executes the request on one or more third-party cloud storage platforms in order to apply the search (through searchable indices) onto the searchable encrypted data and return results of the search request to a source of the search request.

According to another embodiment of the present disclosure, gateway device, through the generalized API, can be configured to receive a request to access/download a file. For implementing the same, the gateway device, also interchangeably referred to as cloud storage gateway device in the present disclosure, first determines whether the access request is authorized based on the access rights defined by the file storage policy (or simply referred to as policy above)

assigned to a user of the plurality of users with which the access request is associated. Once it is determines that the access request is authorized, the gateway device can be configured to gather content of the file by downloading a subset of the distributed searchable encrypted data from each of the one or more third-party cloud storage platforms and decrypt the searchable encrypted data. Decrypted data can then be returned to the user that requested for the file.

Figure 11:
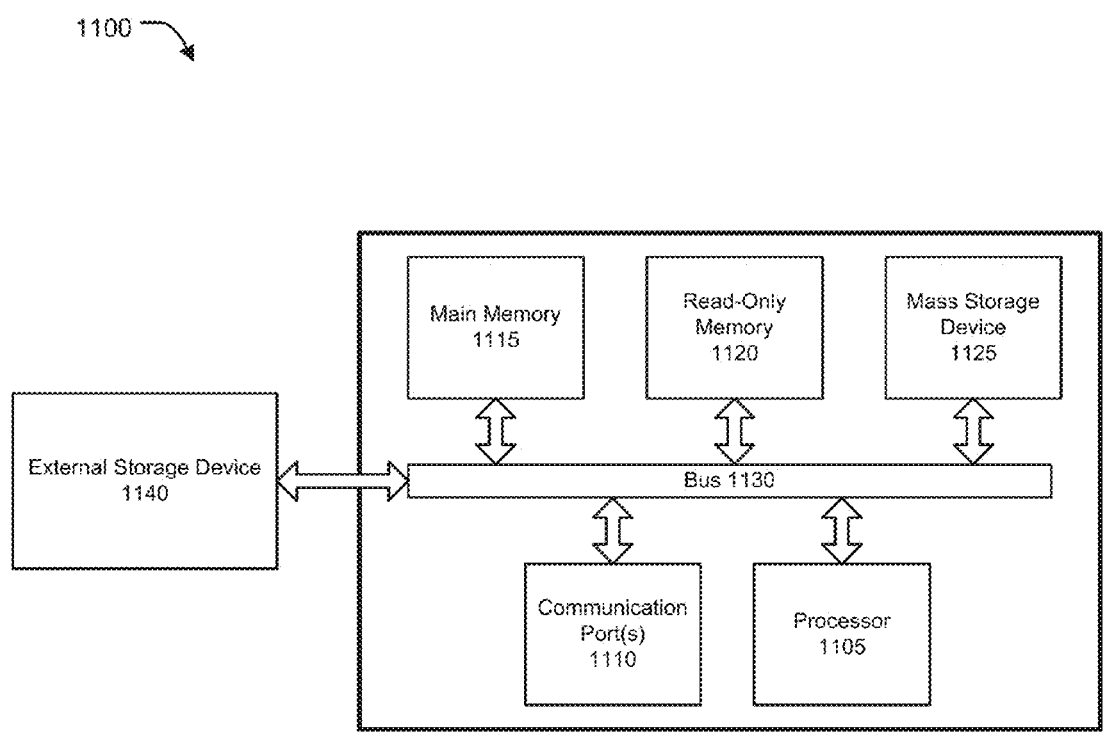
FIG. 11 is an example of a computer system with which embodiments of the present invention may be utilized.

FIG. 11 is an example of a computer system with which embodiments of the present invention may be utilized. Embodiments of the present invention include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 11 is an example of a computer system 1100, such as a cloud gateway, a client or server, upon which or with which embodiments of the present invention may be employed.

According to the present example, the computer system includes a bus 1130, one or more processors 1105, one or more communication ports 1110, a main memory 1115, a removable storage media 1140, a read only memory 1120 and a mass storage 1125.

Processor(s) 1105 can be any future or existing processor, including, but not limited to, an Intel® Itanium® or Itanium 2 processor(s), or AMD® Opteron® or Athlon MP® processor(s), or Motorola® lines of processors. Communication port(s) 1110 can be any of an RS-232 port for use with a modem based dialup connection, a 10/100 Ethernet port, a Gigabit port using copper or fiber or other existing or future ports. Communication port(s) 1110 may be chosen depending on a network, such as a Local Area Network (LAN), Wide Area Network (WAN), or any other network to which the computer system 1100 connects. For example, in the context of a PBX, communication port(s) 1110 may include communication cards supporting Ethernet or DS1/DS3 types of connections and in the context of a fax server, such as one of fax servers 341a-n, communication port(s) 1110 may include Ethernet, DS0, T1/DS1 (such as ISDN PRI) or fractional T1/DS1 or digital DS0 (such as ISDN BRI).

Main memory 1115 can be Random Access Memory (RAM), or any other dynamic storage device(s) commonly known in the art. Read only memory 1120 can be any static storage device(s) such as Programmable Read Only Memory (PROM) chips for storing static information such as start-up or BIOS instructions for processor 1105.

Mass storage 1125 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1130 communicatively couples processor(s) 1105 with the other memory, storage and communication blocks. Bus 1130 can include a bus, such as a Peripheral Component Interconnect (PCI)/PCI Extended (PCI-X), Small Computer System Interface (SCSI), USB or the like, for connecting expansion cards, drives and other subsystems as well as other buses, such as front side bus (FSB), which connects the processor(s) 1105 to system memory.

Optionally, operator and administrative interfaces, such as a display, keyboard, and a cursor control device, may also be coupled to bus 1130 to support direct operator interaction with computer system 1100. Other operator and administrative interfaces can be provided through network connections connected through communication ports 1110.

Removable storage media 1140 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). In no way should the aforementioned exemplary computer system limit the scope of the invention.

While embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention. Therefore, the above description should not be taken as limiting the scope of the invention, which is defined by the appended claims.

What is claimed is:

1. A method comprising:
providing, by a cloud storage gateway device logically interposed between one or more third-party cloud storage platforms and a plurality of users of an enterprise, a generalized application programming interface (API) through which the plurality of users can store files to the one or more third-party cloud storage platforms, issue search requests against the files and retrieve content of the files;
assigning, by the cloud storage gateway device, a file storage policy of a plurality of file storage policies to each user of the plurality of users, the plurality of file storage policies defining access rights, storage diversity requirements and a type of encryption to be applied to the files; and
responsive to receiving, via the generalized API, a request to store a file from a first user of the plurality of users:
creating, by the cloud storage gateway device, searchable encrypted data corresponding to one or more of (i) content of the file and (ii) metadata associated with the file, wherein the searchable encrypted data is based on the type of encryption defined by a first file storage policy of the plurality of file storage policies assigned to the first user, wherein said creating, by the cloud storage gateway device, searchable encrypted data further comprises encrypting content of the file using cryptographic key information defined by the first file storage policy and wherein said encrypting content of the file further comprises:
dividing the file into a plurality of chunks;
creating namespaces for one or more of the plurality of chunks; and
configuring the namespaces of the one or more chunks such that content of the file is encrypted in a manner that makes it searchable; and
distributing, by the cloud storage gateway device, the searchable encrypted data among the one or more third-party cloud storage platforms based on the storage diversity requirements defined by the first file storage policy by uploading a subset of the searchable encrypted data to each of the one or more third-party cloud storage platforms.

2. The method of claim 1, further comprising:
responsive to receiving, via the generalized API, a request to search content of the file or metadata associated with the file:
   determining, by the cloud storage gateway device, whether the search request is authorized based on the access rights defined by a file storage policy of the plurality of file storage policies assigned to a user of the plurality of users with which the search request is associated; and
   when the search request is authorized, causing, by the cloud storage gateway device, the one or more third-party cloud storage platforms to apply the search request to the searchable encrypted data and returning results of the search request to a source of the search request.

3. The method of claim 1, further comprising:
responsive to receiving, via the generalized API, a request to access the file:
   determining, by the cloud storage gateway device, whether the access request is authorized based on the access rights defined by a file storage policy of the plurality of file storage policies assigned to a user of the plurality of users with which the access request is associated; and
   when the access request is authorized, gathering the content of the file, by the cloud storage gateway device, by downloading a subset of the distributed searchable encrypted data from each of the one or more third-party cloud storage platforms and decrypting the searchable encrypted data; and
   returning the file to a source of the access request.

4. The method of claim 1, further comprising managing access to the stored file by the plurality of users based on the plurality of file storage policies.

5. The method of claim 1, wherein said configuring the namespaces comprises storing content of the file as filenames.

6. The method of claim 1, wherein said creating, by the cloud storage gateway device, searchable encrypted data is carried out independent of the one or more third-party cloud storage platforms.

7. A non-transitory computer-readable storage medium embodying a set of instructions, which when executed by one or more processors of a cloud storage gateway device logically interposed between one or more third-party cloud storage platforms and a plurality of users of an enterprise, cause the one or more processors to perform a method comprising:
   providing a generalized application programming interface (API) through which the plurality of users can store files to the one or more third-party cloud storage platforms, issue search requests against the files and retrieve content of the files;
   assigning a file storage policy of a plurality of file storage policies to each user of the plurality of users, the plurality of file storage policies defining access rights, storage diversity requirements and a type of encryption to be applied to the files; and
   responsive to receiving, via the generalized API, a request to store a file from a first user of the plurality of users:
      creating searchable encrypted data corresponding to one or more of (i) content of the file and (ii) metadata associated with the file, wherein the searchable encrypted data is based on the type of encryption defined by a first file storage policy of the plurality of file storage policies assigned to the first user, wherein said creating searchable encrypted data further comprises encrypting content of the file using cryptographic key information defined by the first file storage policy and wherein said encrypting content of the file further comprises:
         dividing the file into a plurality of chunks;
         creating namespaces for one or more of the plurality of chunks; and
         configuring the namespaces of the one or more chunks such that content of the file is encrypted in a manner that makes it searchable; and
      distributing the searchable encrypted data among the one or more third-party cloud storage platforms based on the storage diversity requirements defined by the first file storage policy by uploading a subset of the searchable encrypted data to each of the one or more third-party cloud storage platforms.

8. The non-transitory computer-readable storage medium of claim 7, wherein the method further comprises:
responsive to receiving, via the generalized API, a request to search content of the file or metadata associated with the file:
   determining whether the search request is authorized based on the access rights defined by a file storage policy of the plurality of file storage policies assigned to a user of the plurality of users with which the search request is associated; and
   when the search request is authorized, causing the one or more third-party cloud storage platforms to apply the search request to the searchable encrypted data and returning results of the search request to a source of the search request.

9. The non-transitory computer-readable storage medium of claim 7, wherein the method further comprises:
responsive to receiving, via the generalized API, a request to access the file:
   determining whether the access request is authorized based on the access rights defined by a file storage policy of the plurality of file storage policies assigned to a user of the plurality of users with which the access request is associated; and
   when the access request is authorized, gathering the content of the file by downloading a subset of the distributed searchable encrypted data from each of the one or more third-party cloud storage platforms and decrypting the searchable encrypted data; and
   returning the file to a source of the access request.

10. The non-transitory computer-readable storage medium of claim 7, wherein the method further comprises managing access to the stored file by the plurality of users based on the plurality of file storage policies.

11. The non-transitory computer-readable storage medium of claim 7, wherein said configuring the namespaces comprises storing content of the file as filenames.

12. The non-transitory computer-readable storage medium of claim 7, wherein said creating searchable encrypted data is carried out independent of the one or more third-party cloud storage platforms.

* * * * *